Patented Nov. 4, 1952

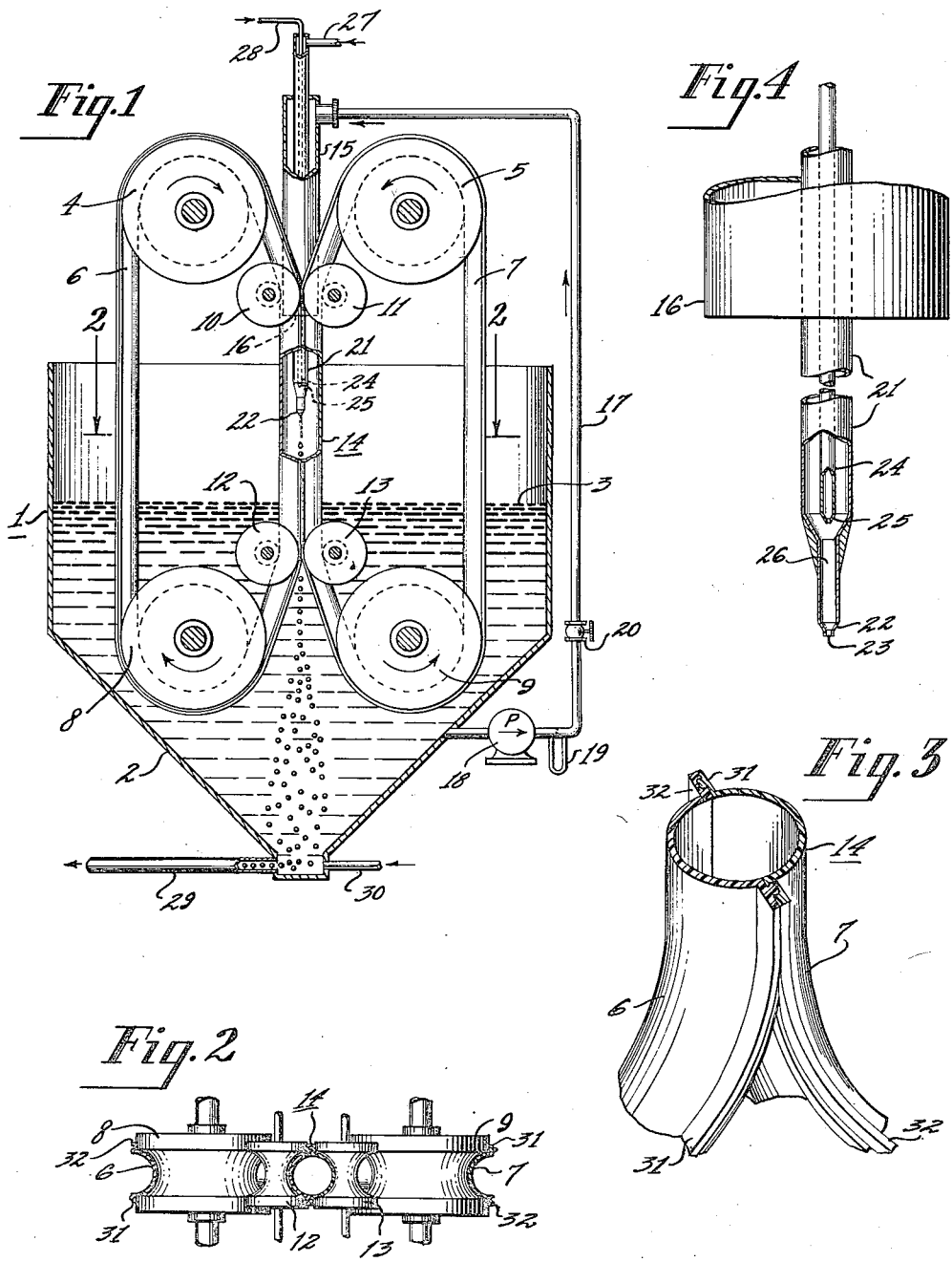

2,616,857

UNITED STATES PATENT OFFICE 2,616,857

GEL BEAD FORMING METHOD AND APPARATUS

Hubert A. Shabaker, Media, Pa., assignor to Houdry Process Corporation, Wilmington, Del., a corporation of Delaware Application January 26, 1950, Serial No. 140,599

13 Claims. (Cl. 252—359)

The present invention relates to the preparation of gels in the form of particles having smoothly curved surfaces, generally designated as "beads." The invention includes improved methods and novel apparatus for the preparation of such gel beads, and is especially directed to the more efficient handling of inorganic gel-forming liquids to produce catalytically active or other adsorptive gels as beads of substantial uniformity in structure and properties.

The production of inorganic gel beads particularly for use as adsorptive contact masses and catalysts by several different methods is known from prior patented art. Siliceous gel beds, and particularly those comprising silica and alumina, are presently employed commercially on a fairly wide scale as catalysts in hydrocarbon conversion processes. Silica gel beads, with and without other metal oxides, have also been proposed for general use as adsorbents, for example as dehydrating agents.

The methods of preparation of such gel beads, disclosed in the prior art, generally include the initial preparation of a hydrosol from reactant solutions, which hydrosol is caused to set to the corresponding hydrogel in a form assumed under the influence of surface tension against a fluid medium which is not miscible with the hydrosol. Because of interfacial tension between the hydrosol and the immiscible medium, the hydrogel is formed and set in a generally spheroidal shape having bounding surfaces corresponding to the interface.

Although the processes and apparatus of the patented art are fairly well adapted to handle hydrosols which set to gels in an appreciable time, they cannot be employed for handling extremely rapidly setting hydrosols, such as those setting in a fraction of a second.

The time required for setting of a sol to gel will depend upon temperature, pH, and concentration of the gel-forming components. At a given temperature and pH, the setting time decreases with increasing product concentration of the gel-forming reactants. The choice of pH conditions are largely determined by the desired composition and resulting properties of the finished gel. Compositions of high product concentration are particularly desirable from the standpoint of improved properties of the dried gels prepared therefrom, as well as because of economic advantages in their preparation as a result of reduced requirements of processing liquid and/or wash water, lower drying loads due to decreased aqueous content, and overall step-up in production rates. In addition, because of the shorter setting time of such high product concentration gels, it will be seen, that the size of the equipment can be considerably reduced for the production and handling of a given quantity of beads. Although hydrosols setting to gels of high product concentration can be prepared, the presently known processes and apparatus, as previously indicated, because of the very short setting time of such products, cannot be ordinarily employed for the production of gel beads therefrom.

Among the objects of the present invention, therefore, is the provision of novel apparatus and improved methods that can be applied efficiently to the production of gel beads from rapidly setting gel-forming liquids.

In accordance with the present invention, a stream of gel-forming hydrosol is caused to flow into a body of concurrently flowing oil or other liquid immiscible with the hydrosol, which immiscible liquid is moving at substantially the same velocity as the stream of hydrosol. Preferably, the immiscible liquid is contained between partitioning members also moving at substantially the same velocity as the immiscible liquid, so that as a result of such substantially equal velocities, the said liquid is effectively stationary with respect to the partitions and is therefore free from turbulence, which would otherwise be present if the liquid were moving at relatively high speed with respect thereto. In the preferred embodiment the partitioning members form an enclosing tube. As the stream of sol moves away from its point of admission into the flowing body of oil it separates into segments, which as a result of surface tension pull up into spherical globules in the oil, while the non-turbulent oil is maintained relatively stationary with respect to these globules. Under the same conditions in the oil, these globules soon set to spherical hydrogel beads, which are then removed from the body of oil and processed and dried in known or desired manner.

The process and apparatus of the invention may be applied particularly to the preparation of substantially spherical pellets of gel from any gel-forming liquid and particularly to hydrosols which set rapidly to gels. Among the more important or more widely used products, special mention may be made of siliceous gels, such as silica gel alone or mixed siliceous gels containing other components, particularly hydrous oxide components such as those of alumina, zirconia, molybdena, magnesia, beryllia, chromia, iron oxides, etc. If feasible, one or more soluble metal compounds furnishing these oxides may be reacted in the presence of a silicate in required proportions and under proper conditions of pH and concentration to form a mixed hydrosol capable of setting to the composite gel. In other instances, or if otherwise desired, the additional metal oxide or oxides may be incorporated in the form of fine solid particles such as powder into the silica or other siliceous hydrosol, or in one of the solutions entering into the reaction mixture for forming such siliceous hydrosol.

Silica gel beads may be employed as desiccants, adsorbents, or as supports or carriers for catalytic materials. In the latter instances the gel may be impregnated before or after drying with solutions of salts that can be reacted or decomposed to form the metal oxide desired to be incorporated in the silica.

Composites of silica and certain of the metal oxides described above are well known for use as catalysts particularly in hydrocarbon conversion processes. Useful catalysts can be prepared in accordance with the present invention by any of the techniques described above, including coprecipitation, powder incorporation, or impregnation of a formed spherical gel pellet. In addition to siliceous bodies the process of the invention may also be applied to the preparation of non-siliceous gels such as those of alumina, chromia, iron oxide, etc. alone, or in admixture with other metal oxides, for use as catalysts and catalyst supports.

In the preferred practical embodiment of the invention the sol and the oil flow downward with respect to external surroundings as does the enclosed tube containing the oil. Preferably also the oil may be flowed at a linear rate slightly faster than the sol, but not in excess of about a difference of 5% of the linear velocity of the sol; to impart a positive drag on the hydrosol assisting globule formation.

Other objects and advantages of the present invention will be apparent from the detailed description below, considered together with the accompanying drawings, wherein:

Figure 1 is a partly schematic vertical section through the apparatus; certain portions being shown in elevation;

Figure 2 is a partial transverse section taken on the line 2—2 of Figure 1;

Figure 3 is an enlarged perspective view of a portion of the apparatus, and

Figure 4 is an enlarged longitudinal elevation through a part of the apparatus; portions being broken away and shown in cross-section.

Referring particularly to Figure 1, there is shown a suitably supported tank 1, preferably circular in horizontal cross-section, and having a frustro-conical lower portion designated at 2. The tank is adapted to contain a water-immiscible liquid, such as oil, maintained therein at a suitable level as indicated at 3. The oil level in the tank may be controlled and adjusted by suitable means (not shown), such as a constant level float control valve. Suitably mounted above the top of the tank 1, are opposed pulleys 4 and 5 having, in the illustrated embodiment, substantially semi-circular grooved rims for supporting belts 6 and 7 which are shaped to fit within the grooves. These belts, as shown, are also trained around pulleys 8 and 9 located within the tank 1, the latter pulleys being similar in configuration to the pulleys 4 and 5. Either set of pulleys, preferably the lower pulleys 8 and 9, may be mechanically driven by any suitable means (not shown) located outside of the tank, arranged to rotate the horizontally opposed pulleys at the same rate but in opposite directions. The pulleys are rotated so as to cause the inner runs of the belts 6 and 7 to move downwardly. Below the pulleys 4 and 5, there are shown upper horizontally opposed idler rolls 10 and 11 and lower horizontally opposed idler rolls 12 and 13 in vertical alinement therewith. These idler rolls in accordance with the illustrated arrangement, are located inwardly of the centers of the respective pulleys 4, 5, 8 and 9, and are mounted so as to urge the inner laps of the belts 6 and 7 towards each other and into closed engagement at their opposing edges, thereby forming between the level of rolls 10 and 11 and that of the rolls 12 and 13, a vertically disposed closed tubular portion generally designated at 14. The pulleys 10, 11, 12 and 13 have grooved rims conforming to the desired curvature of the belts. Suitable means may be provided for mounting the pulleys and for adjusting tension between pulleys both in horizontal and vertical direction, in well known manner.

It will be understood that the particular arrangement of pulleys illustrated and above described is only one of several possible arrangements that can be employed for the purpose of bringing opposed downward runs of the endless belt in cooperating tube-forming relation. For instance, with the belts 6 and 7 formed of a pliable or laterally yieldable material, the pulleys 4, 5, 8, and 9 may be formed with flat belt-engaging surfaces, or in other shapes than that illustrated; the belts being urged to assume the required curvature by intermediate idlers including those illustrated at 10, 11, 12 and 13, or any desired number of additional sets of such idlers. Also it is not necessary to journal the pulleys 4, 5, 8, and 9, in offset relation to the tube 14; the axles of these pulleys may be brought closer together to the point that the opposed downwardly-moving runs of the belts 6 and 7 are in contact at about the common horizontal diameter of the pulleys 4 and 5, and that of the pulleys 8 and 9.

In vertical alinement with the tube 14 formed by the opposed belts 6 and 7, and extending above the top of said tube, there is shown a vertically disposed communicating supply conduit 15, through which oil or other water-immiscible liquid, identical with that contained in the tank 1, is continuously supplied to the tube 14. Conduit 15 extends downwardly for some distance into the tube 14 formed between the belts 6 and 7 as indicated at 16. The oil is supplied from the bottom of the tank 1 to the conduit 15 by means of a communicating line 17 and variable speed pump 18, designed to supply the oil at a constant rate determined by the desired linear flow velocity through conduit 15 and into tube 14. The line 17 is equipped with suitable flow control devices including flow meter 19 and valve 20.

Extending into the tube 14 formed between belts 6 and 7, there is shown a conduit 21 tapered at its lower end (Figure 4) to form a nozzle 22, terminating in a discharge orifice 23. The conduit 21 extends above the top of conduit 15. Located centrally within the conduit 21 there is shown an internal conduit 24 having a discharge outlet 25 terminating at a required distance above the outlet 23 of conduit 21 and providing between the discharge orifice of conduit 24 and the outlet 23, a mixing chamber 26. Conduits 21 and 24 communicate respectively with liquid supply lines 27 and 28.

The tank 1, at the bottom of the frustroconical portion 2 thereof, communicates with a discharge conduit 29, through which the formed gel particles are discharged and transported. Flow of liquid through conduit 29 is preferably induced by the introduction of liquid in line therewith, as by means of a liquid supply line 30. Operating in this manner the oil level 3 in tank 1 can be maintained substantially constant by regulating the supply of liquid from line 30.

As more particularly shown in Figure 3, the belts 6 and 7 are provided at their opposing edges with extending flanged portions 31 and 32, sealing the edges of tube 14 at the line of contact between the belts 6 and 7. The flanges 31 and 32 may be formed with flat faces of soft rubber or similar material, in which event it may be necessary to provide additional idlers longitudinally spaced along the path of travel of the tube, the idlers being arranged to contact the outer edges of the flanges and urge the same in contact to maintain the desired seal. Preferably the opposed faces of flanges 31 and 32 are formed with suitable interfitting and interlocking respective male and female parts, such as the bead and groove arrangement illustrated in Figure 3.

The belts 6 and 7 are preferably formed of a liquid impervious textile web; or a chemical-resistant rubber, such as neoprene, reinforced with incorporated textile webs or strands so as to limit stretch. Pulleys 8, 9, 12 and 13, located below the level of the oil tank 1, are preferably formed with smooth polished side faces so as to reduce disturbance of the oil bath to a minimum; the other pulleys may have similar side faces.

In operation of the illustrated apparatus, oil is filled to the indicated level 3 in the tank, and the circulation of the oil by means of pump 18 begun, to supply the oil at the required rate to conduit 15 and the tube 14, substantially filling that tube and forming a closed oil circulation system. Power is then applied to pulleys 8 and 9 to drive the same at a rate providing a linear velocity of the parallel opposed runs thereof forming the tube 14, substantially equal to the linear velocity of the oil passing through conduit 15. Reactant solutions, which on admixture form hydrosols capable of rapidly setting to gels, are supplied respectively to conduits 21 and 24 through lines 27 and 28. For instance, an alkali metal silicate solution may be supplied to the conduit 27, and a solution of required pH of aluminum sulfate or sodium aluminate supplied to the conduit 24. The two solutions are admixed by contact in the chamber 26 in conduit 21 and the reaction mixture discharged through the orifice 23 into the moving column of oil within the tube 14. The feeding rate of the solutions and their proportions are controlled so that the stream of reaction mixture discharged through orifice 23 is moving substantially at the same linear velocity as the oil in tube 14. As the reaction mixture descends with the column of oil, it is formed into segments which pull up into substantially spherical globules, and these globules are set to gel in that form, at or at some distance above the level 3 of the oil bath in tank 1. The spherical gel particles are discharged together with the oil into the bath in tank 1 at the mouth of tube 14. Because of the velocity head of the oil stream discharged from tube 14 into the oil bath in tank 1, the gel particles therein continue their generally downward movement and are carried into the transporting conduit 29, under the impelling influence of the stream of liquid introduced through line 30. By means of conduit 29 the gel particles are conveyed to desired further treatment.

The liquid introduced through supply line 30 may be oil or an aqueous liquid immiscible with oil. In the latter instance the aqueous liquid may contain salts consistent with the syneresis liquid in the gel, so as to minimize osmotic pressure between the gel and the aqueous sluice liquid; advantageously recycled wash liquor from the gel may be used as transporting liquid.

The hydrogel globules may be delivered by the sluice liquid in transporting conduit 29 to a washing or processing vat or to any suitable means for draining the liquid from the globules. The transporting liquid, may be returned to the tank through line 30, after being freed from hydrogel globules, and the separated hydrogel globules subjected to further processing in known or desired manner, including washing, purifying, such as for removal of sodium ions; and drying. Since the hydrogel ordinarily shrinks in drying to an extent depending upon the manner and conditions of drying, such shrinkage must be taken into consideration if it is desired to produce dried beads of any particular size. In general for use as catalysts or contact adsorbents, dried beads of about 1 to 5 millimeter size are preferred.

The diameter of the nozzle orifice 23 will be fixed depending upon the size of the beads desired. Increase in velocity of the hydrosol stream discharged through orifice 23 produces a corresponding increase in mass flow rate, so that the highest capacity of output per unit of equipment is obtained at highest stream velocity. Since the linear rate of oil flow in tube 14 substantially corresponds to that of the hydrosol stream or exceeds the same only by the slight difference previously described, and there is no substantial relative movement between the oil and its enclosing tube, there is no theoretical limit as to maximum velocities that can be employed. Mechanical considerations in the operation of pump and driving mechanism will determine the maximum and efficient practical limits on velocity. In general it can be stated that operating velocities up to and above 50 feet per second lie within the practical operating range. In contrast thereto, if the body of oil in which gelation takes place is flowed through a stationary tube of practical dimension the possibility of turbulence exists at velocities well below about 20 feet per second.

The mixing zone 26 in the conduit 21 is of comparatively short length—as short as practicable to obtain adequate mixing—in order that the hydrosol may be discharged just as soon as mixing has been accomplished, so that gelation does not occur within the nozzle. At high liquid flow rates in the order of about 20 feet per second and above, the residence time of the reaction mixture within the mixing zone will be quite short, and gelation within the nozzle is avoided.

The liquid medium employed in the tank 1 and in the tube 14, broadly referred to as an oil in the description above, may be any liquid or combination of liquids immiscible with water, including petroleum naphtha, kerosene, hydrocarbon oils, halogenated hydrocarbons, such as carbon tetrachloride or perchlorethylene, alkyl esters of carboxy acids such as dibutyl phthalate; or compatible mixtures of the recited liquids giving desired density and viscosity. Preferably the immiscible liquid is selected as one having a specific gravity approximate that of the hydrosol, so as to limit significant relative movement of the hydrosol globules in the immiscible liquid. For silica-alumina hydrosols having a product concentration of about 125 grams $SiO_2$ plus $Al_2O_3$ per liter, for instance, a suitable immiscible liquid would be a mixture of mineral oil and perchlorethylene having a specific gravity of about 1.1 and a viscosity of about 10 to 25 centipoises at operating temperature.

The apparatus and method described can also be employed for handling of sols setting in about a second or more provided that a body of oil of proper flow rate and adequate height is furnished for setting of the hydrosol. (A) For instance a typical silica-alumina hydrosol prepared from commercial water glass, aluminum sulfate, and sulfuric acid in proportions resulting in a pH of about 8 and containing 93 parts $SiO_2$ to $7Al_2O_3$ by weight, and having a product concentration of 100 grams $SiO_2$ plus $Al_2O_3$ per liter, will set in about one second after mixing at room temperature. In handling such a sol by the method of the present invention, a non-turbulent column of oil of adequate height correlated with flow rate would be required to permit setting of the hydrosol therein with a sufficient factor of safety to assure that setting to a firm solid gel takes place before the globule is discharged from the column. At a linear velocity of 10 feet per second this would entail the provision of a column of oil of about 12 or more feet in height.

The invention finds its more important applications and the advantages thereof are more pronounced in handling hydrosols setting in a fraction of a second, for instance in a half second and preferably in about 0.1 second or less. Such gels will generally be of considerably higher product concentration than the slower setting gels, with the attendant benefits hereinbefore pointed out. (B) For example, a hydrosol of the same composition as described under (A) above, but of lower liquid content, giving a product concentration of silica and alumina equal to 130 grams per liter will set in about 0.1 second. In handling such hydrosol, the linear velocity of the oil and the tube-forming belts may be higher than before; a suitable operation would be at 22 feet per second. Again employing an oil or mixture having substantially the same specific gravity as the hydrosol, or slightly below, the circulation rate of the oil is set to deliver a column moving downward within the tube, which may be about 4 inches in diameter, at the required velocity of 22 feet per second, and the speed of rotation of the driven pulleys is also adjusted to move the opposing belts downward at substantially that same linear velocity. The gel-forming reactants are supplied in required proportions and at a rate to deliver a stream of hydrosol from orifice 23 at the same linear velocity of 22 feet per second. The hydrosol will, under the described conditions, set to globules of gel at a distance of about 2.2 feet below the point of discharge from the orifice 23. A total height of some 4 feet from the discharge orifice 23 to the level 3 of the oil bath in tank 1 will be more than adequate to assure the formation of hardy gel globules before the globules leave the tube and are admitted to the larger body of oil contained in the tank 1.

It will be evident from known liquid flow considerations that a body of oil cannot be moved through a narrow stationary tube at velocities approaching that hereinabove indicated without creating turbulence. For instance, an oil of 0.97 specific gravity and 20 centipoises viscosity flowing at 22 feet per second in a 4-inch stationary tube would be decidedly turbulent; for under the described conditions the Reynolds number is about 44,000 whereas streamline flow requires a Reynolds number below about 2100.

In the preperation of a single oxide gel, there may be fed to the mixing chamber a solution of the salt of the metal whose oxide is required and a precipitant therefor. For instance, to prepare a silica gel, a solution of alkali metal silicate is fed through one of the liquid conducting lines communicating with the mixing chamber while a solution of mineral acid is supplied through the other line.

In the preparation of beads for use as catalyst, such as those comprising silica and alumina, the spherical gel particles may be conveyed through conduit 29 to suitable tanks or other apparatus for washing the gel with water and with ammonium salt solution or other solutions containing volatilizable cations capable of base exchanging zeolitically held sodium in the gel. The gel beads may then be dried in known manner to obtain slow and uniform drying until major shrinkage of the hydrogel is substantially completed after which more rapid drying may be used to bring the dried gel to desired moisture content. Prior to use as catalyst, the gel beads may be calcined in air, steam, or mixtures thereof for hardening and adjustment of activity.

Although in the illustrated embodiment the belts forming the oil-containing tube are shown as completely enclosing the column of oil, the invention includes alternative arrangements wherein the moving body of oil is not completely so enclosed. For instance, the flowing body of oil may be contained between flat or inwardly curved partitions separating the same from the main body of oil in the tank; these partitions, moreover, may be in the form of belts moving horizontally or vertically through the main body of oil in the tank and at the same linear rate as the oil therebetween, without the respective edges of the belts being in contact.

Obviously many modifications and variations of the invention as hereinbefore set forth may be made without departing from the spirit and scope thereof and, therefore, only such limitations should be imposed as are indicated in the appended claims.

I claim as my invention:

1. The process of forming spheroidal particles of hydrogel, which comprises introducing a stream of gel-forming hydrosol into a body of concurrently flowing water-immiscible liquid while continuously flowing said water-immiscible liquid uniformly as a laterally confined column substantially free from turbulence and while said column of water-immiscible liquid at least in the vicinity of introduction of said hydrosol is free from flow-retarding influences at the confined lateral boundaries thereof, said stream of hydrosol being introduced into said flowing column of water-immiscible liquid at approximately the linear velocity of the latter and said stream of hydrosol being thereby formed into separated segments in said water-immiscible liquid without substantial relative movement therebetween, which segments are caused to assume globular shape under the influence of the surrounding water-immiscible liquid, maintaining the thus formed globules of hydrosol within the flowing column of water-immiscible liquid while said hydrosol is set to spheroidal pieces of hydrogel, and separating the set pieces of hydrogel from said column of water-immiscible liquid.

2. The process of forming spheroidal particles of hydrogel from a hydrosol having a short setting time, which comprises ejecting a stream of such a hydrosol under pressure into a downwardly moving column of water-immiscible liquid having approximately the same specific gravity as the hydrosol, concurrently flowing said column of water-immiscible liquid and said stream of hydrosol at approximately the same linear velocity so as to avoid substantial relative movement therebetween, laterally confining said column of immiscible liquid by opposed downwardly-moving partitioning members travelling at a linear velocity substantially equal to that of said immiscible liquid, the hydrosol while in said immiscible liquid being divided into portions which assume globular shape under the influence of interfacial tension, and maintaining said globular shaped portions of hydrosol in said immiscible liquid for a sufficient period of time to permit said globules to set to hydrogel during concurrent movement thereof with said column of immiscible liquid.

3. The process in accordance with claim 2 wherein the partitioning members and said column of oil are caused to travel at a linear velocity such that if said members were maintained stationary with respect to said immiscible liquid, said immiscible liquid would be turbulent.

4. The process of forming spheroidal particles of hydrogel which comprises ejecting a stream of hydrosol into a downwardly moving column of water immiscible liquid having approximately the same specific gravity as the hydrosol and flowing concurrently therewith at approximately the same linear velocity as the stream of hydrosol, said immiscible liquid flowing as a body of fixed lateral cross-section wherein all portions of said liquid over such cross-section are flowing at substantially the same linear velocity, the hydrosol when in said immiscible liquid being divided into portions which assume globule shape under the influence of interfacial tension, which globules set to spheroidal hydrogel particles while travelling in and with said column of immiscible liquid.

5. The method of forming spheroidal hydrogel particles, which comprises continuously flowing oil into a moving confining tube travelling concurrently at substantially the same linear rate as the oil, whereby said oil is caused to flow with and within said tube without substantial turbulence introducing at the same linear rate into said flowing oil a stream of inorganic gel-forming liquid, permitting said gel-forming liquid to assume the form of a plurality of globules by interfacial contact with said oil, and maintaining said globules in said oil for a sufficient period of time to permit said globules to set to hydrogel.

6. The method in accordance with claim 5 wherein said gel-forming liquid is a siliceous hydrosol.

7. The method in accordance with claim 5 wherein said gel-forming liquid comprises hydrous silica and hydrous alumina.

8. The method in accordance with claim 5 wherein said gel-forming liquid is the total reaction product of an alkali metal silicate and a water soluble aluminum compound present together in high product concentration.

9. The method of preparing spheroidal bead particles from colloidal liquids hvaing a high product concentration of gel-forming components and having the property of setting to gel in less than a second, which comprises distributing spaced globules of such a colloidal liquid in a rapidly flowing confined body of a second liquid immiscible with said colloidal liquid and having approximately the same specific gravity as said colloidal liquid, retaining said globules in said second liquid for a time at least sufficient to permit said globules to set to gel; and preventing turbulence in said second liquid, which would otherwise result from its rapidity of flow, by maintaining said confined body of the second liquid substantially free from flow retarding influences at the lateral boundaries thereof.

10. The method of forming spheroidal particles of hydrogel comprising the steps of flowing a stream of hydrosol capable of setting to a hydrogel into a body of liquid immiscible therewith to form under the influence of the surface tension of said hydrosol spheroidal particles of the same, moving the body of liquid from the point of contact of said hydrosol and liquid and in substantially the direction of flow of said stream at substantially the velocity of the latter, maintaining substantially equal velocity of motion of said liquid and spheroidal hydrosol particles at least until the latter have set to hydrogel form, and separating the resulting hydrogel particles from said immiscible liquid.

11. Apparatus for forming hydrogel beads comprising a pair of cooperating opposed endless belts having inner runs moving downwardly, upper and lower rotatable circular belt-engaging members in horizontally opposed paired relation contacting said belts, said members having concaved belt-engaging surfaces and each of said belts at least between said upper and lower engaging members conforming in lateral configuration to said belt-engaging surfaces, at least part of the belt-engaging members having concaved surfaces being laterally spaced to bring their circular peripheries into such proximity as to cause tight contact between opposed extremities of said belt thereby causing the opposed inner runs of said belt to form a tube; a liquid-conducting conduit communicating with the tube thus formed, a liquid ejecting nozzle passing through said conduit and into said tube, and means for actuating said belts.

12. Apparatus for forming gel beads comprising a tank adapted to contain liquid, an upper horizontally opposed pair of pulleys mounted for rotation on parallel horizontal axes above said tank, a lower horizontally opposed pair of pulleys within said tank similarly mounted for rotation on parallel horizontal axes, means for positively rotating one pair of said horizontally opposed pulleys simultaneously in opposite directions and at the same speed to cause the adjacent portions of the peripheries of said pair to move downwardly, opposed endless belts trained over an upper and lower pulley of each pair respectively whereby the opposed inner runs of said belt are caused to move downwardly in parallel relation, said belts at least during movement through a portion of their inner runs having opposed concave faces in tube-forming relation, means for maintaining contact between respective opposed edges of said belts during movement through said portion of the inner run to form a tube between said opposed concave faces, a conduit communicating with the tube thus formed, means for continuously conveying liquid from said tank to said conduit, and a nozzle within said tube for ejecting a separate liquid into said tube.

13. Apparatus according to claim 11 wherein said belts are formed of pliable material and the concave faces thereof are formed by passing said belts over concave belt-engaging surfaces during operation of said apparatus.

HUBERT A. SHABAKER.

No references cited.